United States Patent
Ishii

(10) Patent No.: US 7,715,139 B2
(45) Date of Patent: May 11, 2010

(54) METHOD OF TESTING MAGNETIC DISC DEVICE

(75) Inventor: Koji Ishii, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 231 days.

(21) Appl. No.: 11/384,677

(22) Filed: Mar. 20, 2006

(65) Prior Publication Data

US 2007/0133114 A1    Jun. 14, 2007

(30) Foreign Application Priority Data

Dec. 13, 2005   (JP) ............................... 2005-359038

(51) Int. Cl.
  *G11B 5/09*   (2006.01)
  *G11B 27/36*   (2006.01)
(52) U.S. Cl. .......................................... 360/53; 360/31
(58) Field of Classification Search ................. None
  See application file for complete search history.

(56) References Cited

U.S. PATENT DOCUMENTS

| | | | | |
|---|---|---|---|---|
| 4,748,524 A | * | 5/1988 | Fukaya et al. | ............... 360/135 |
| 5,986,847 A | * | 11/1999 | Le et al. | ................... 360/78.14 |
| 6,078,454 A | | 6/2000 | Takahashi et al. | |
| 6,178,054 B1 | * | 1/2001 | Wakefield | ..................... 360/31 |
| 7,177,979 B2 | * | 2/2007 | Kuwamura | .................. 711/112 |
| 7,369,351 B2 | * | 5/2008 | Date et al. | ............... 360/77.08 |
| 2004/0264021 A1 | * | 12/2004 | Lim et al. | ...................... 360/31 |
| 2006/0139791 A1 | * | 6/2006 | Date et al. | ............... 360/77.08 |

FOREIGN PATENT DOCUMENTS

| | | |
|---|---|---|
| JP | 8-221918 | 8/1996 |
| JP | 2000-322848 | 11/2000 |
| JP | 2001-256743 | 9/2001 |

* cited by examiner

*Primary Examiner*—Daniell L Negrón
(74) *Attorney, Agent, or Firm*—Greer, Burns & Crain, Ltd.

(57) ABSTRACT

A write head, which is positioned by reading a servo pattern with a read head, writes data on even tracks of a magnetic disc, and then writes data on odd tracks. Then a read head is positioned on a read position and sequentially reads all the written data. As a result, it is decided whether a read error has occurred. Further, positional deviation of the tracks, in which the read error occurs, is measured.

1 Claim, 11 Drawing Sheets

Fig.9

| TARGET ERROR RATE | $1 \times 10^{-3}$ | DETERMINATION |
|---|---|---|
| ERROR RATE OF p1 | $1 \times 10^{-0}$ | × |
| ERROR RATE OF p2 | $1 \times 10^{-0.2}$ | × |
| ERROR RATE OF p3 | $1 \times 10^{-0.5}$ | × |
| ERROR RATE OF p4 | $1 \times 10^{-3.1}$ | ○ |
| ERROR RATE OF p5 | $1 \times 10^{-0}$ | × |
| ERROR RATE OF p6 | $1 \times 10^{-0}$ | × |
| ERROR RATE OF p7 | $1 \times 10^{-0}$ | × |
| ERROR RATE OF p8 | $1 \times 10^{-0}$ | × |
| ERROR RATE OF p9 | $1 \times 10^{-0}$ | × |
| ERROR RATE OF p10 | $1 \times 10^{-0.2}$ | × |
| ERROR RATE OF p11 | $1 \times 10^{-0.5}$ | × |
| ERROR RATE OF p12 | $1 \times 10^{-3.1}$ | ○ |

METHOD OF TESTING MAGNETIC DISC DEVICE

BACKGROUND OF THE INVENTION

1. Field of the Invention

The present invention relates to a method of testing a magnetic disc device, and, more particularly, it relates to a method of testing a magnetic disc device to detect a deviation of a track attributable to an abnormal track pitch.

2. Description of the Related Art

In general, a magnetic disc device uses a write head to record data or information into a magnetic disc, and uses a read head to reproduce the recorded data or information. In recent years, most magnetic disc devices have a write head and a read head combined with each other, instead of using one head to read and write data. When the write head writes data on a disc, the read head is used to read positioning information or servo information, which is written in advance in a magnetic disc as a servo pattern, so as to position the write head on a predetermined track. When the read head reads, the read head is positioned on a predetermined track so as to read the data, based on the servo information read by the read head.

Therefore, a servo pattern needs to be written at a constant feeding pitch or a constant track pitch so as to correctly indicate a track position. However, at the time of writing a servo pattern into a disc, a track can have an uneven track pitch in some cases. This track-pitch deviation occurs when a voice coil motor that moves the write head to write the servo pattern does not rotate satisfactorily, or when a push pin that moves the head to be used by a servo track writer is contacted unsatisfactorily, or when an environmental shock occurs. This track-pitch deviation similarly occurs at the time of writing a servo pattern on a magnetic disc after the magnetic disc is assembled into a magnetic disc device, or at the time of writing a servo pattern on a magnetic disc before the magnetic disc is assembled into a magnetic disc device.

A track of which the track width has become too small cannot be used. When a read head and a write head are provided separately, a relationship between the read head and the write head changes due to a deflection angle of an arm on which the head is mounted, and the relationship between the read head and the write head also changes due to a deviation of a track width. In other words, when there are narrow or wide tracks between the read head and the write head, it is not possible to accurately control the write head position on a predetermined track based on the read head position.

Correction of a deviation that occurs due to a deflection angle or a yaw angle of the arm is known as described in Japanese Patent Application Unexamined Publication No. 2000-322848. However, the technique described in this publication is not designed to detect a deviation of a track caused by an abnormal track pitch.

SUMMARY OF THE INVENTION

In the light of the above problems, it is an object of the present invention to provide a method of testing a magnetic disc device to detect a deviation of a track pitch and to measuring the size of the deviation.

In order to solve the above problems, according to a first aspect of the present invention, there is provided a method, for testing a magnetic disc device, including at least: writing data on every other track of a magnetic disc; a step of writing data on the rest of the tracks; reading data from all tracks in which data are written; and deciding whether a read error occurs.

According to a second aspect of the present invention, the method for testing a magnetic disc device according to the first aspect further includes: arranging that data is written on a track in which a read error occurs, and no data is written into tracks surrounding the track in which the read error occurs; starting reading of data from a position away from one side of the track, and sequentially reading data at some positions, each of which is gradually closer to the track; and obtaining a first position where an error rate of reading the data reaches a predetermined error rate, wherein a position of the track is calculated based on at least the first position.

According to a third aspect of the present invention, the method for testing a magnetic disc device according to the second aspect further includes: starting reading of data from a position away from the other side of the track, and sequentially reading data at some positions, each of which is gradually closer to the track; and obtaining a second position where an error rate of reading the data reaches a predetermined error rate, wherein a position of the track is calculated based on the first position and the second position.

According to a fourth aspect of the present invention, the method for testing a magnetic disc device according to the first aspect further includes: arranging that data is written on a track in which a read error occurs, and no data is written into tracks surrounding the track in which the read error occurs; a step of starting reading of data from a position with a distance from the track, and reading the data at a predetermined position, while bringing a read position close to the track; and a step of measuring a gain of an automatic gain control circuit through which an obtained read signal passes, wherein a position of the track is obtained based on a value of the gain.

According to a fifth aspect of the present invention, the method for testing a magnetic disc device according to the fourth aspect includes obtaining an area of a gain graph showing a relationship between the read position and the gain, and setting a read position where the area is halved, as a position of the track.

According to the present invention, writing data into every other track is repeated, thereby writing data into all tracks. After this step, the data are read to accurately detect a deviation of a track caused by a deviation of a feeding pitch or an abnormal track pitch at the time of writing servo information. Further, by measuring a size of track deviation, a highly reliable test can be executed.

BRIEF DESCRIPTION OF THE DRAWINGS

FIG. 9 is an explanatory diagram of one example of a result of detecting an error rate by a method of measuring a size of track deviation using an offset margin according to the present invention;

Figure 1:
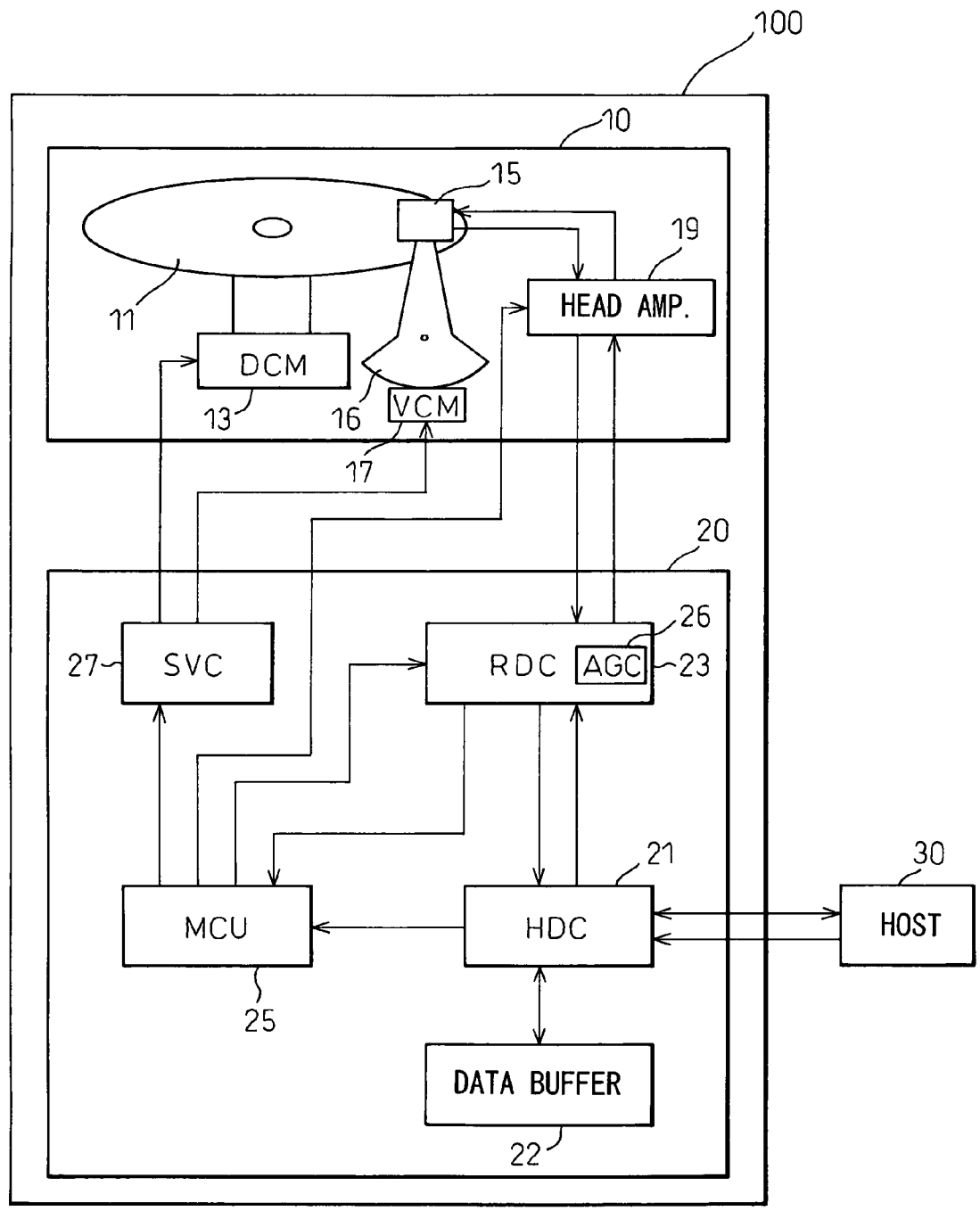
FIG. 1 is an explanatory diagram of a magnetic disc device according to an embodiment of the present invention.

100 Magnetic disc device
10 Disc enclosure
11 Hard disc
13 Direct current motor
15 Head
16 Arm
17 Voice coil motor
19 Head amplifier
20 Printed circuit board
21 Hard disc controller
22 Data buffer
23 Read channel
25 Micro control unit
27 Servo controller
30 Host computer

DETAILED DESCRIPTIONS

FIG. 1 shows a schematic configuration of one example of a magnetic disc device 100 using a magnetic disc according to the present invention. The magnetic disc device 100 has a disc enclosure 10 and a printed circuit board 20. The disc enclosure 10 includes a hard disc 11 as a magnetic recording medium, a direct current motor (DCM) 13 that rotates the hard disc 11, a head 15 that reads data from and writes data on the hard disc 11, an arm that supports the head 15, a voice coil motor 17 that turns the arm 16 to move the head 15 in the radial direction of the hard disc 11, and a head amplifier 19 that amplifies a read signal read by the head 15 and amplifies a write signal to be written by the head 15.

On the printed circuit board 20, there are disposed a servo controller 27 that controls a current supplied to the direct current motor (DCM) 13 and the voice coil motor 17, a read channel (RDC) 23 that receives a read signal from the head amplifier 19 and transmits a write signal, a hard disc controller 21 that receives read data from the RDC 23 and sends write data to the RDC 23, a data buffer 22 that transfers from 1 to the controller 21, and a micro control unit 25 that controls the servo controller 27, the head amplifier 19 and RDC 23. The hard disc controller 21 transmits data to a host computer 30, receives instructions from the host computer 30, transmits a write signal to the read channel 23, and receives a read signal from the read channel 23. These signals are also stored in the data buffer 22. The micro control unit 25 obtains address information from the hard disc controller 21, obtains position information from the read channel 23, and controls the servo controller 27, the voice coil motor 17, and the read channel 23.

The test of a magnetic disc according to the present invention is usually carried out as a test of the magnetic disc device shown in FIG. 1. In order to aid understanding of the test method according to the present invention, an abnormal track pitch to be detected is explained in detail first.

Figure 2A:
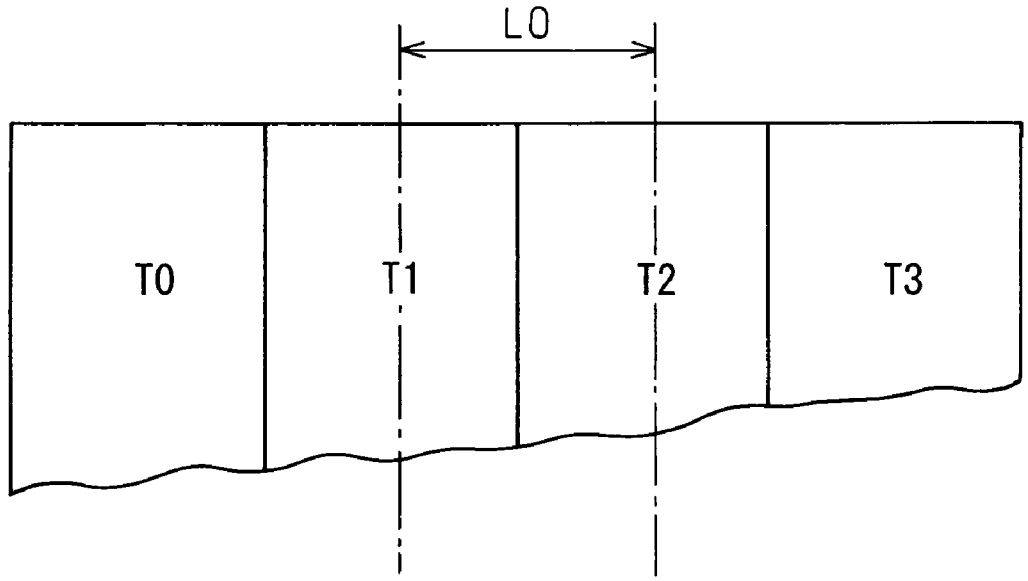
FIG. 2A is an explanatory diagram of a normal track pitch.
Figure 2B:
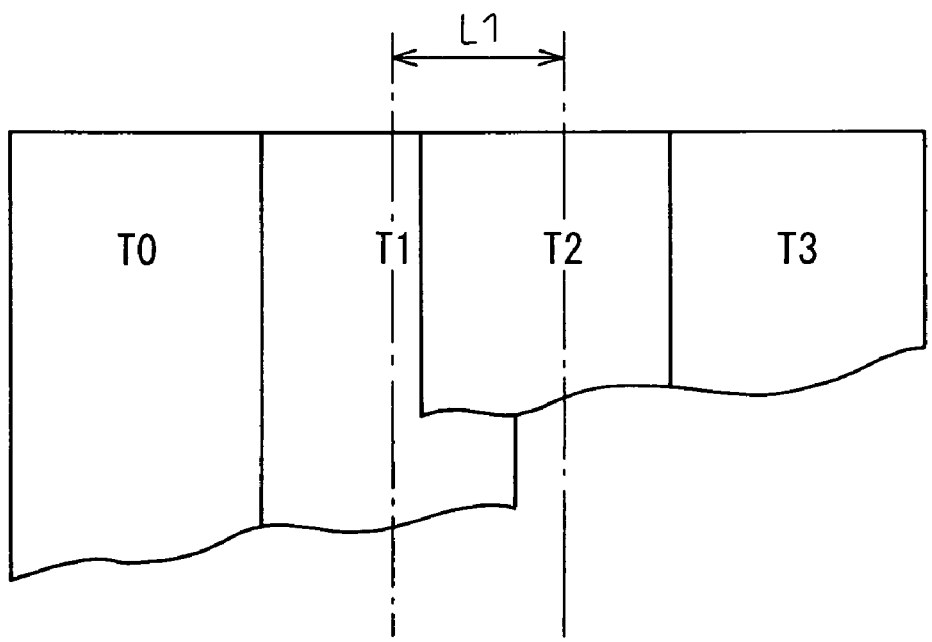
FIG. 2B is an explanatory diagram of a narrow track pitch.

On a magnetic disc on which a servo pattern is written, a concentric track is defined by the servo pattern. Data is written on this track, and is read from this track. FIG. 2 shows a state that data is written into a track. FIG. 2A shows a state that a servo pattern is normally formed, and a track pitch L0, which is a distance between two adjacent track centers, is constant from a track T0 to a track T3. FIG. 2B shows a state that a track pitch L1 between the track T1 and the track 2 is smaller than a track pitch L0 due to a certain abnormality. As is clear from FIG. 2B, a part of data written into the track 1 is overwritten by data that is written into the track 2 thereafter. In this case, an error rate of reading the data from the track 1 becomes high, therefore this data cannot be normally read. On the other hand, a part of the data written into the track 2 is overwritten by data that is written into the track 1 thereafter. As a result, the track 1 and the track 2 cannot be normally used.

Figure 3A:
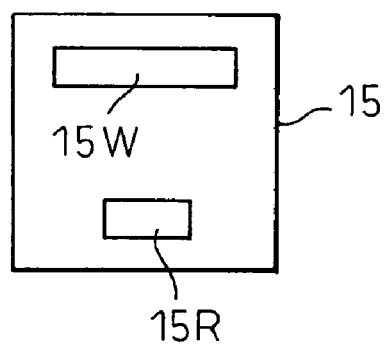
FIG. 3A is an explanatory diagram showing a relationship between a write head and a read head.

As shown in FIG. 3A, the magnetic head 15, such as an MR (Magneto Resistive) head, a GMR (Giant Magneto Resistive) head, or a TuMR (Tunneling Magneto Resistive) head, has a read head 15R and a write head 15W. There is a separation between the read head 15R and the write head 15W. The separation is between heads that correspond to a horizontal magnetic recording or a vertical magnetic recording.

Figure 3B:
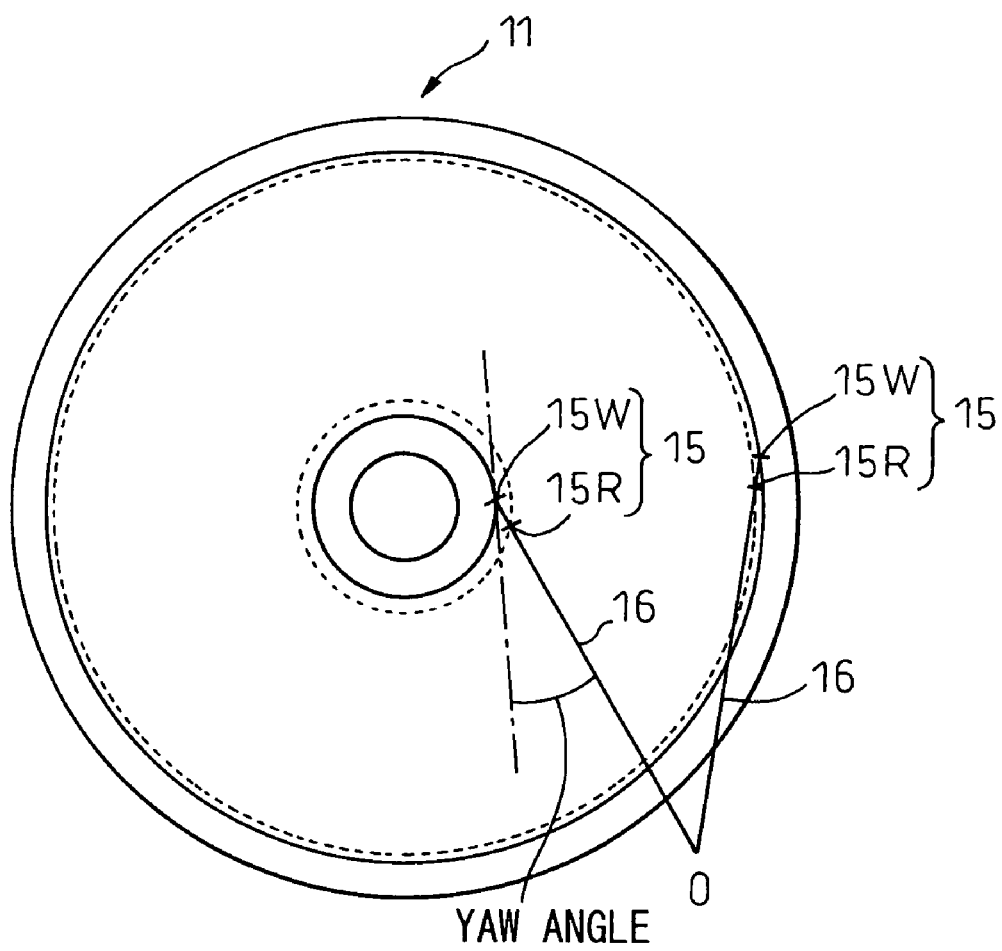
FIG. 3B is an explanatory diagram showing a relationship between a write head and a read head on a magnetic disc.

In order to change the on-track position of the head 15, usually, head position control using a rotary VCM (voice coil motor) is carried out. Specifically, as shown in FIG. 3B, the magnetic head 15 disposed at the front end of the arm 16 moves while drawing an arc track in a radial direction of the magnetic disc 11, following the turn of the arm 16 that is driven by the voice coil motor. In FIG. 3B, O denotes a center of the rotation of the magnetic head.

As shown in FIG. 3B, because a track is formed concentrically, a track that the read head 15R traces is different from a track that the write head 15W traces. In FIG. 3B, a solid line denotes a track on which the write head is positioned, and a dotted line denotes a track on which the read head is positioned. For example, when a distance between the read head 15R and the write head 15W is within a range of 5 μm to 10 μm, there are many tracks between the read head 15R and the write head 15W, because the track pitch is 0.2 μm to 0.3 μm. Further, due to the movement of the arm, a yaw angle, formed by a tangent line of a track and the center line of the head, changes. Therefore, the number of tracks between the read head 15R and the write head 15W changes, that is, a size of the core deviation changes. Conventionally, the core deviation is controlled to be changed corresponding to the size of the yaw angle.

The magnetic disc device using such heads has a further track deviation, caused by an abnormal track pitch, if the track pitch becomes abnormal due to the track-pitch deviation at the time of writing a servo pattern.

Figure 4A:
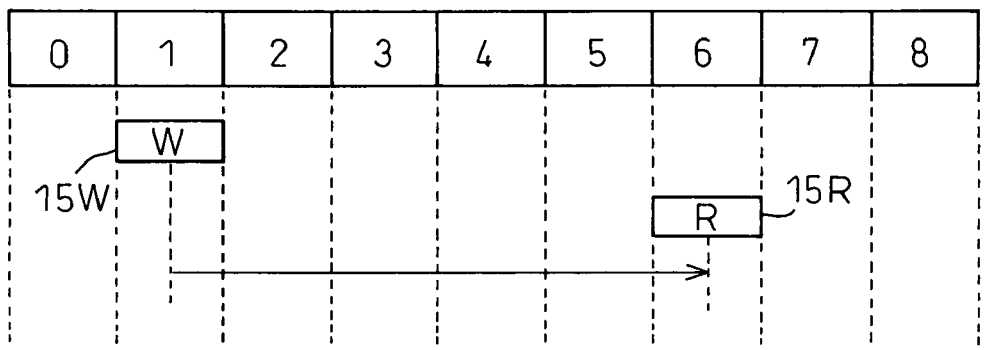
FIG. 4A is an explanatory diagram of ordinary correction of a core deviation.
Figure 4B:
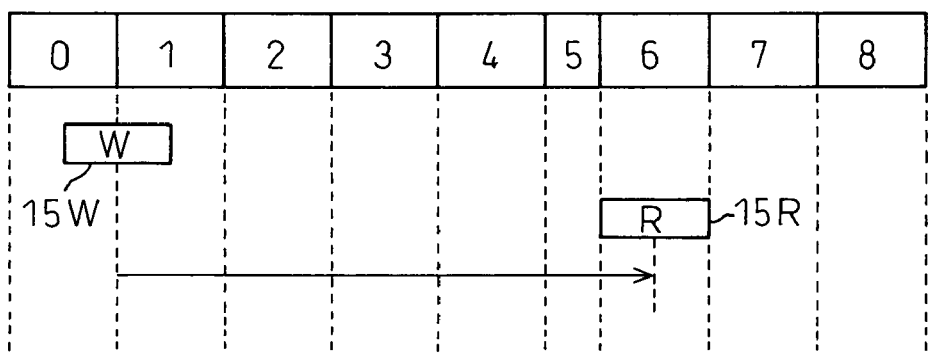
FIG. 4B is an explanatory diagram showing a state that there is a narrow track pitch between a write head and a read head.
Figure 4C:
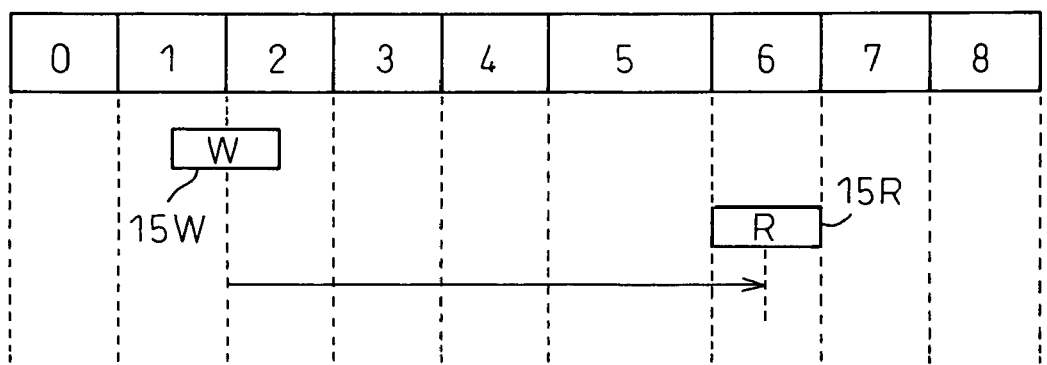
FIG. 4C is an explanatory diagram showing a state that there is a wide track pitch between a write head and a read head.

FIGS. 4A to 4C show a relationship between heads and tracks. As shown in FIG. 4A, when a core deviation due to a yaw angle is five tracks, in order to write data into the track T1, a read head 15R is shifted by five tracks and is positioned on the track T6. In other words, the write head 15W writes data on the track 1, while a read track 15R is controlled to be positioned on the track T6 to read the servo pattern written in the track T6. Therefore, if a servo pattern is written at a constant pitch determined in advance, data can be correctly written on tracks, and data can be read correctly. In FIGS. 4A to 4C, a yaw angle is virtually constant. If a yaw angle changes greatly, the size of the core deviation is corrected depending the change of the yaw angle.

If the track T5 has a portion narrower than a predetermined pitch due to an abnormal writing of a servo pattern, as shown in FIG. 4B, and even if the read head 15R is positioned on the track T6 to write data into the track T1, the write head 15W cannot be correctly positioned on the track T1 when the track portion having the narrow track pitch is present between the read head 15R and the write head 15W. As a result, data is written partly on the track T0 and partly on the track T1. When previously-written data is present on track T0, this data is overwritten by the data to be written on the track T1. Therefore, the data previously written in the track T0 cannot be read. Further, even if the read head 15R tries to read data from the track T1, the error rate becomes high and the data cannot be read from the track T1, because the data is not correctly written on the track T1.

FIG. 4C shows a case when a wide track pitch occurs in the track T5 at the time of forming a servo pattern. Even when the track pitch becomes wide, if a yaw angle is zero, data written on an adjacent track does not erase or overwrite the data previously written on the track T5, unlike the case when the track pitch of the track T5 becomes narrow. However, when the yaw angle is not zero, a deviation also occurs in the positioning of the write head, in a similar manner to that when a narrow track pitch is formed. As shown in FIG. 4C, even when the read head 15R is controlled to be positioned on the track T6 to write data into the track T1, the write head 15W cannot be accurately positioned on the track T1. As a result, data to be written on the track T1 is written partly on the track T1 and partly on the track T2. The data written on the track T2 is overwritten by data to be written on the track T2. Further, even if an attempt is made to read the data written in the track T1, the error rate becomes high and the data cannot be correctly read, because the data is not correctly written in the track T1.

The present invention provides a method of detecting unevenness of a track pitch or track deviation caused by the abnormal track pitch, and a method of measuring a size of this deviation. Embodiments of the present invention are explained below with reference to the drawings.

Figure 5:
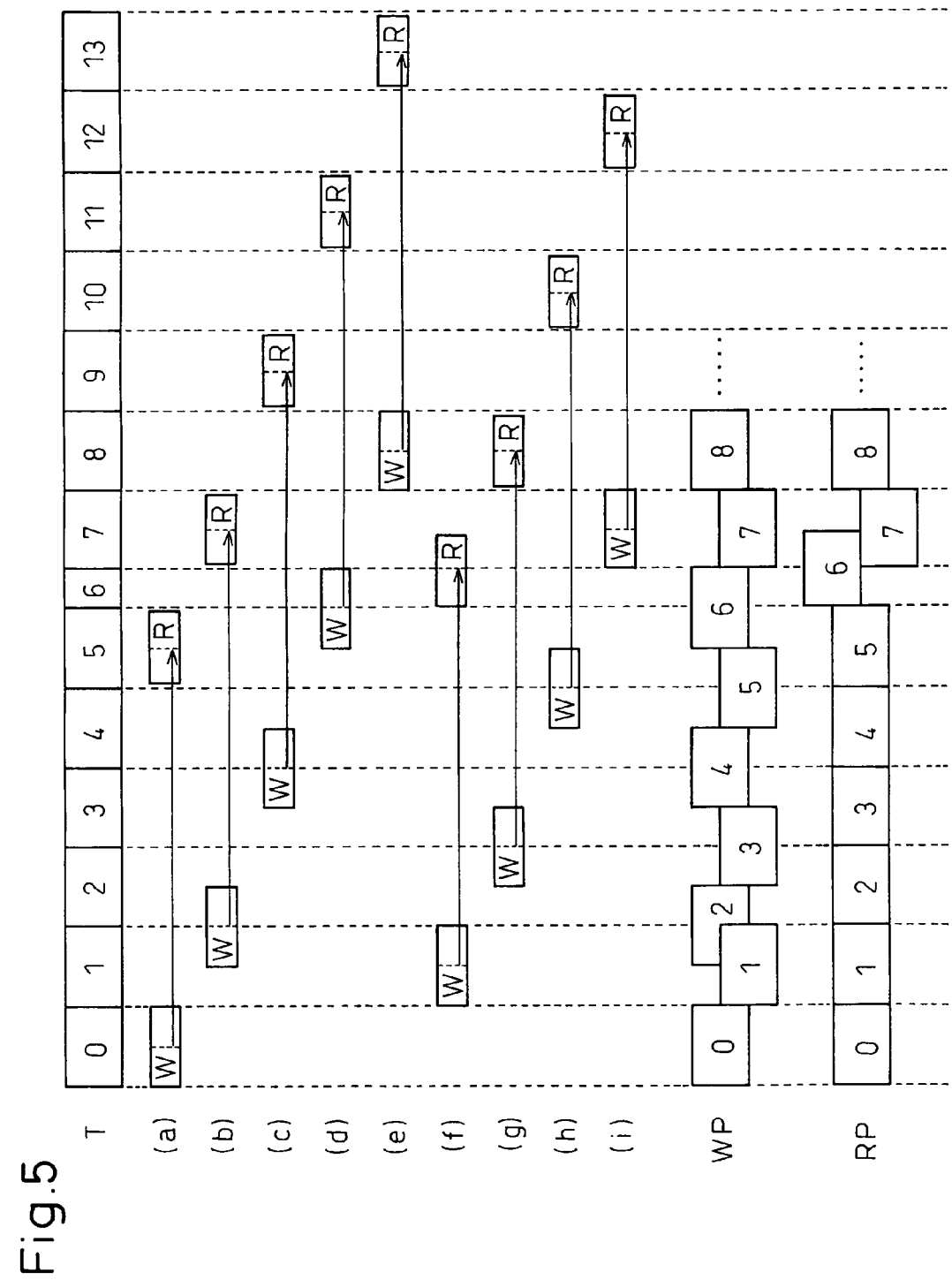
FIG. 5 is an explanatory diagram of a detection of a track deviation that occurs when data is separately written into even tracks and odd tracks.

FIG. 5 schematically shows tracks of a disc in which a servo pattern is written. Numbers at the top of FIG. 5 are track numbers. Tracks T0 to T13 are shown in a vertical direction. A pitch of the track T6 has a smaller width than a normal pitch. In FIG. 5, (a) to (i) denote a relationship between a write head W and a read head R during a data writing period. A line with an arrowhead that connects between the write head W and the read head R expresses a compensation for core deviation.

In FIG. 5, (a) to (e) show writing of data into even tracks T0, T2, T4, T6, and (f) to (i) show writing of data into odd tracks T1, T3, T5, T7. At a lower part of FIG. 5, a position at which the write head W writes data is expressed as a track write position WP. A position at which the read head R reads data is expressed as a track read position RP.

Figure 6:
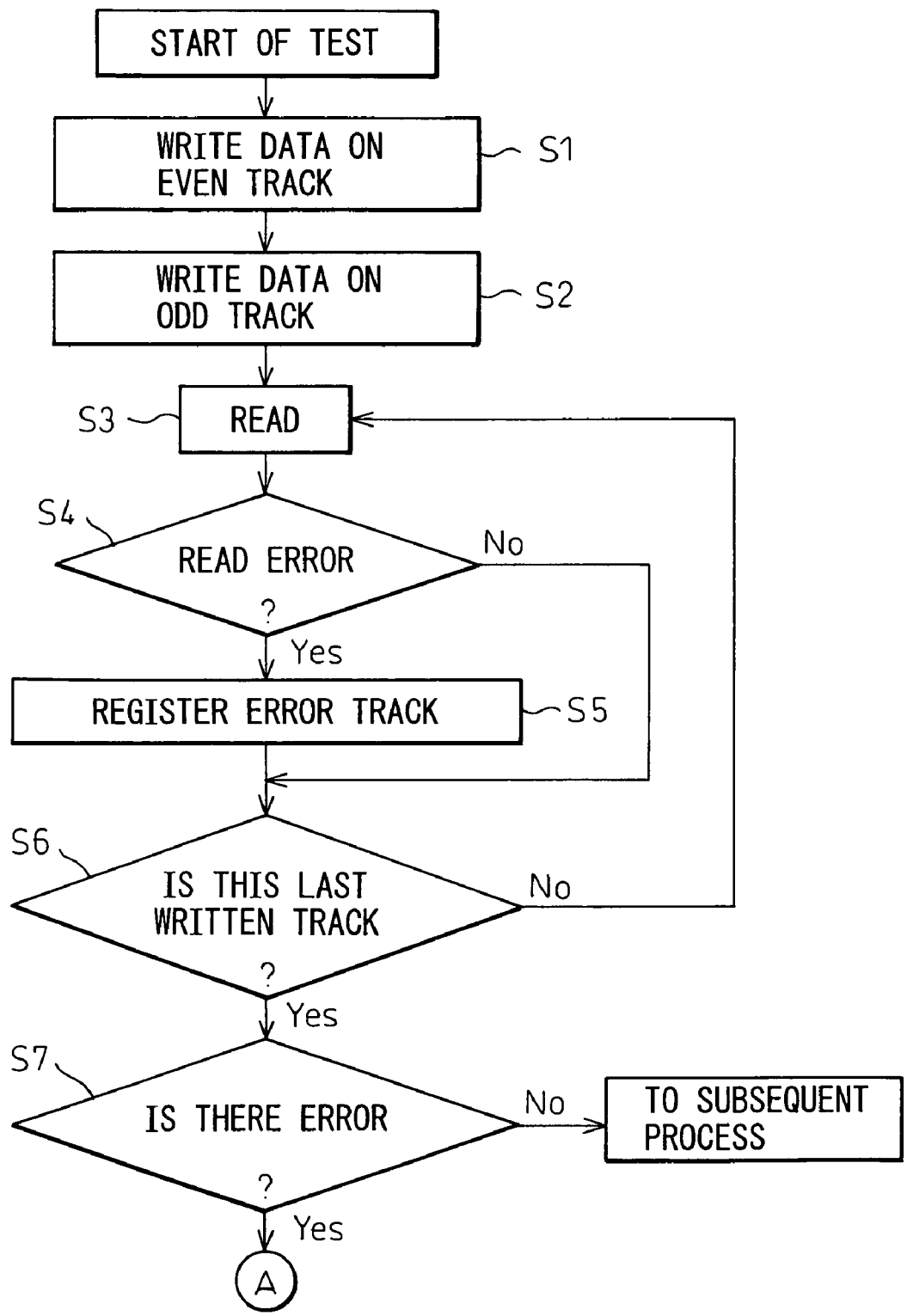
FIG. 6 is an explanatory diagram of an operation flow of detecting a track deviation according to the present invention.
Figure 7:
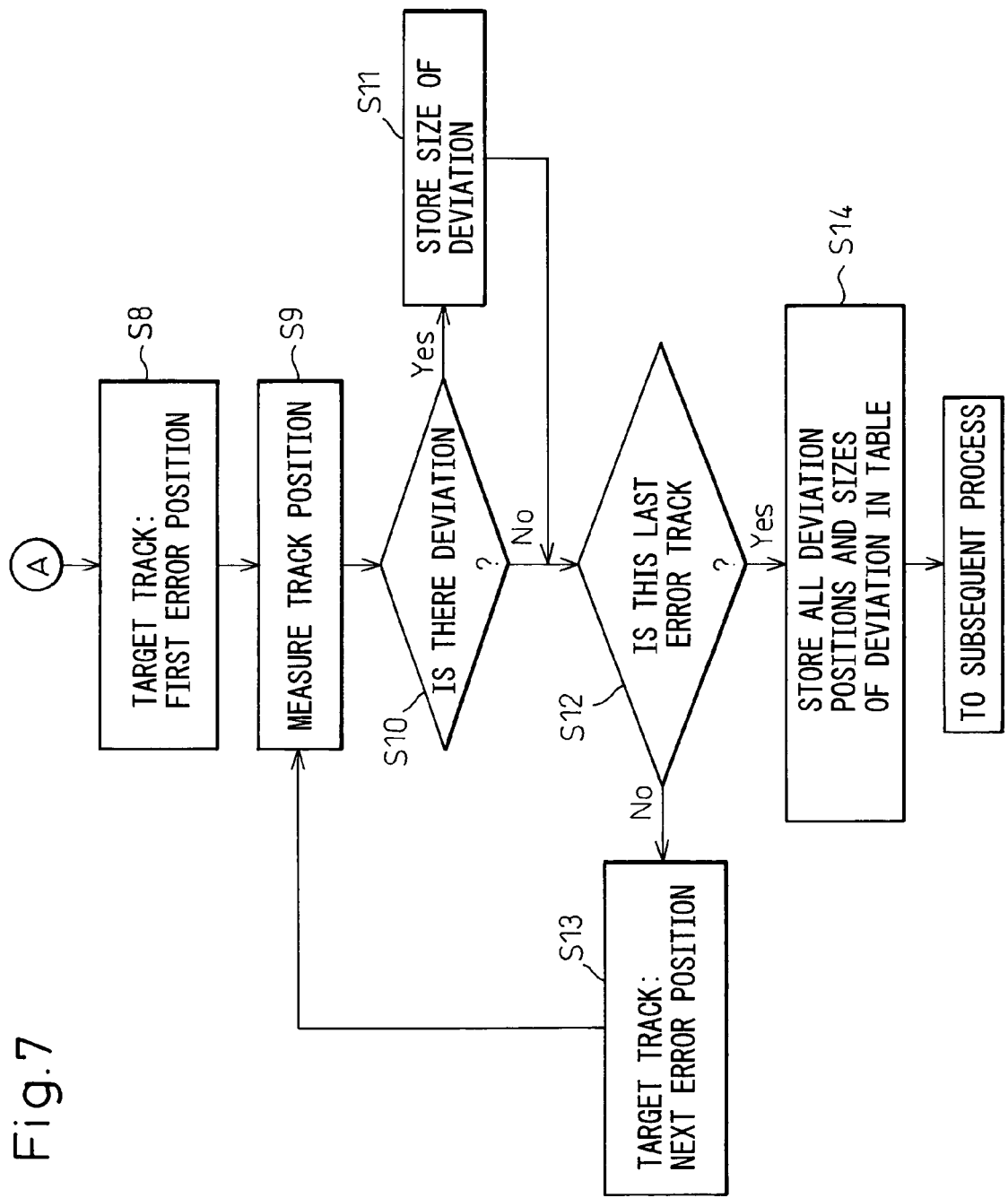
FIG. 7 is an operation flow of measuring a size of track deviation after detecting the track deviation according to the present invention.

FIG. 6 and FIG. 7 show flowcharts for explaining a method of testing tracks shown in FIG. 5. FIG. 6 shows steps of detecting an abnormal track pitch, and FIG. 7 shows steps of measuring a size of deviation of a track pitch in which an abnormal track pitch is detected.

The steps of detecting an abnormal track pitch are explained first with reference to FIG. 5 and FIG. 6.

When a test process is started, mutually different predetermined data are written into the even tracks T0, T2, T4, etc., among the tracks T0, T1, T2, etc. that are determined by a servo pattern (step S1).

In the present example, there are five tracks that require correction of core deviation as shown in FIG. 5. Therefore, first in (a), at the time of writing data on the track T0, the read head R is positioned on the track T5. Next, in (b), data is written on the track T2 by positioning the read head R on the track T7. Next, in (c), data is written on the track T4 by positioning the read head R on the track T9. Thereafter, in (d) and (e), in order to position the write head W on a track in which data is to be written, the read head R is positioned by considering the correction of the core deviation, which corresponds to five tracks, and the data is written into predetermined tracks. In this way, data are written into all even tracks on the disc.

At the time of writing data into the track T2 by positioning the read head R on the track T7 in (b), the write head W is not accurately positioned on the track T2, because the track T6 has a narrow track pitch. Therefore, the write head W straddles the boundary between the track T1 and the track T2 to write data on these tracks. Similarly, at the time of writing data into the track T4 in (c), the write head W straddles the boundary between the track T3 and the track T4 to write data on these tracks, because the track T6 has a narrow track pitch. At the time of writing data into the track T6 in (d), the write head W straddles the boundary between the track T5 and the track T6 to write data on these tracks, because the track T6 has a narrow track pitch. At the time of writing data on the track T8 in (e), there is no abnormal track between the write head W and the read head R. Therefore, when the read head R is positioned on the track T13, data is accurately written into the track T8.

After the data are written on the even tracks starting from the track T0 to the last even track, data are written on the odd tracks T1, T3, T5, etc. (step S2)

When the read head R is positioned on the track 6 in (f), data is written accurately on the track T1. Although the track T6 has a narrow pitch, the read head R can be positioned on the track T6. In (g), data is written on the track T3 by positioning the read head R on the track T8. In this case, the write head is not accurately positioned on the track T3, because the track T6 having a narrow track pitch exists between the write head W and the read head R. The write head W straddles the boundary between the track T2 and the track T3 to write data into these tracks. Similarly, at the time of writing data into the track T5 in (h), the write head W straddles the boundary between the track T4 and the track T5 to write data into these tracks. At the time of writing data into the track T7 in (i), the narrow track T6 is not between the write head W and the read head. Therefore, when the read head R is positioned on the track 12, data is accurately written into the track 7. In this way, data are written into all odd tracks. A result of writing the data into all tracks is shown as the track write positions WP. As is shown in FIG. 5, the tracks WP2 to WP6 on which data are written straddle adjacent track boundaries, without being accurately positioned on the tracks T2 to T6 defined by the correct servo pattern.

After the data are written on all tracks, these data are read out sequentially starting from the track T0 (step S3). A position of the read head R at the time of sequentially reading data starting from the track T0 is expressed as the read position RP.

When the read head R is positioned on the track T0, the data written in the track T0 is accurately read. A part of the data to be written on the track T2 is written into the track T1 by the writing of the data on the even track at step S1. However the data is overwritten by the writing into the odd track at the next step S2. Therefore, the data written in the track T1 at step S2 can be accurately read out, when the read head R is positioned on the track T1.

However, at the time of reading data from the track T2, data written into the track T2 and data written into the track T3 are mixed in the track T2 (see the write position WP). Therefore, an error rate becomes high, and the data cannot be read out accurately. Consequently, it is decided that the track T2 has an error, and the track T2 is registered as an error position (step S5).

Similarly, each of the track T3 to the track T6 has mixture of data in adjacent tracks, and read error occurs in these tracks. Data can be read accurately from the track T8. As explained above, when a track pitch becomes narrow due to a write error of the servo pattern, a read error occurs not only in the track having a narrow track pitch but also in a track on which data is written when a narrow track exists between the write head W and the read head R. This error similarly occurs when a track has a wide track pitch.

According to the method of sequentially writing data on tracks and reading data from the tracks, an abnormal track pitch cannot be detected accurately. In the case of sequentially writing data into all tracks, the data to be written into the track T2 overwrites data that has been correctly written into the track T1, and the data on the normal track T1 cannot be read.

According to the method of the present embodiment, after data are dividedly written into odd tracks and even tracks, the data are read out sequentially starting from the track T0. Thereby, abnormal tracks due to an error of forming a servo pattern can be detected correctly.

A method of measuring a position of a track on which data is not correctly written and a cannot be correctly read is explained below with reference to FIG. 7 to FIG. 11.

When presence of read error is checked in all tracks, a track in which an error occurs first is selected as a target track to be measured (step S8).

Next, a position of the target track is measured (step S9). In the present embodiment, a method using an offset margin of a read head, or a method using an AGC (Automatic Gain Control) gain of a read signal is used to obtain a position of the target track.

A method of obtaining a track position using an offset margin of a read head is explained below with reference to FIG. 8 and FIG. 9. The offset margin corresponds to a distance from the center of a track to the center of a read head. According to this measuring method, an offset margin is set so that the read head is located at a position with a distance from a track to be measured. By gradually changing the offset margin, the read head is gradually brought close to the track, thereby determining whether the read head can read data that is written on the track, and measuring a position of the track.

First, a target error rate is determined. A target rate is determined as, for example, $1\times10^{-3}$ (see FIG. 9) although the target rate is not limited to this value. This error rate is a rate of error sectors for all read sectors, the rate of $1\times10^{-3}$ indicates that data cannot be read from one sector of 1,000 sectors.

Figure 8:
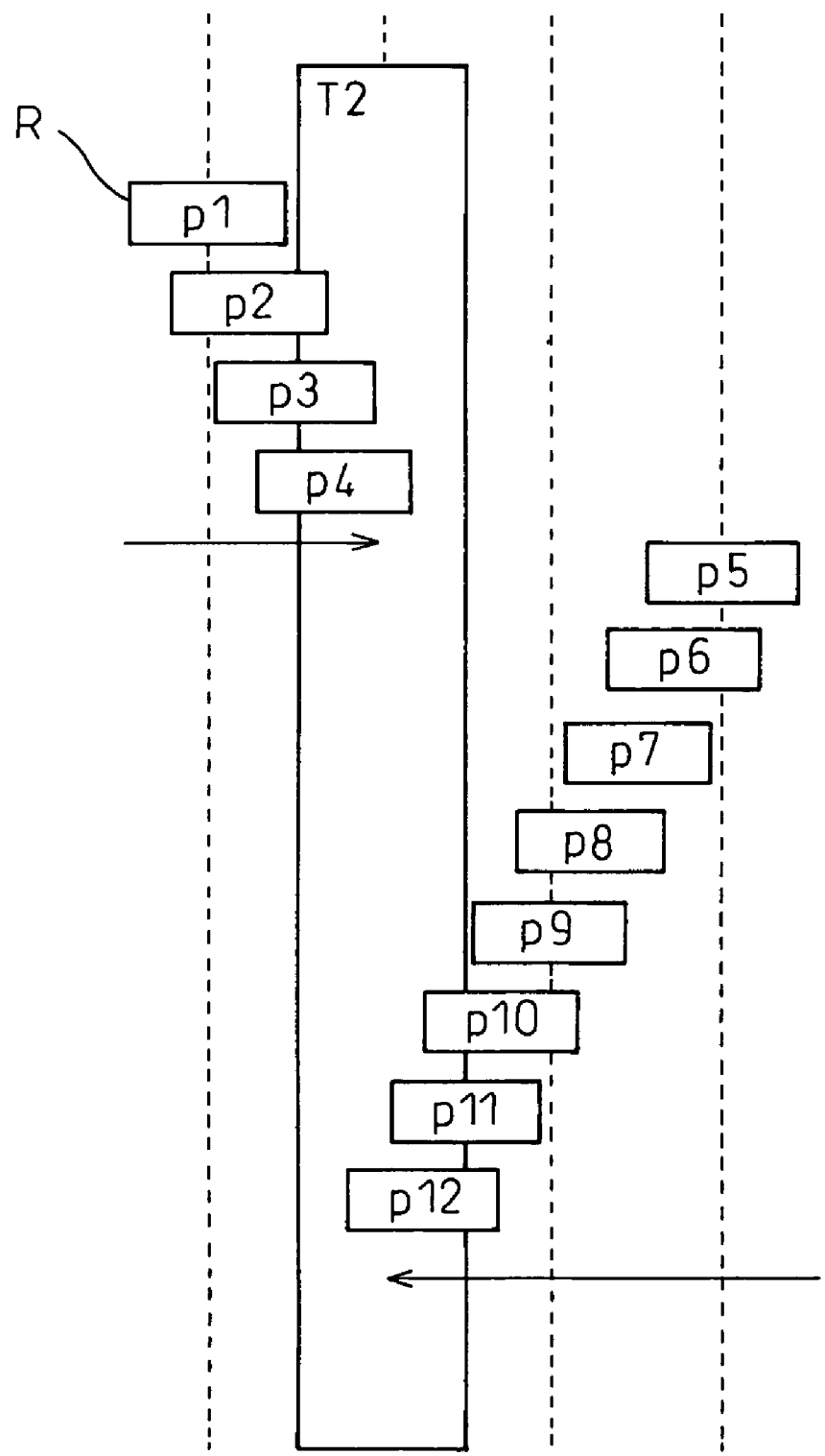
FIG. 8 is an explanatory diagram of a method of measuring a size of track deviation using an offset margin according to the present invention.

As shown in FIG. 8, when the target track is the track T2, only data written in the track T2 is left, and surrounding data are erased. Alternatively, after the data in the track T2 and in the surrounding area are erased by a direct current or by a high-frequency alternating current, data is written into only the track T2.

Next, the read head R is set to an offset position p1 with a distance from the data in the track T2, data is read at the offset position p1, and an error rate is measured. There is no written data at the offset position p1. Therefore, an error rate is zero in the position p1.

Next, the read head R is brought slightly closer to the track T2 by a predetermined distance, data is read at an offset position p2, and an error rate is measured. Subsequently, the read head R is brought closer to the track T2 by a predetermined distance, data is read at offset positions p3 and p4, and an error rate is measured at these offset positions.

FIG. 9 shows an example of a result of measuring error rates at respective positions shown in FIG. 8. At the offset position p2, the read head R can slightly touch the track T2, and can read data from the track T2 in some cases. Therefore, a certain numerical value appears, instead of zero, as an error rate. At the offset position p4, when an error rate exceeds the target value, the read head R is set to an offset position p5 with a distance from the track T2, at the opposite side of the offset position p1 relative to the track T2. Thereafter, an error rate is measured at the offset position p5, and error rates are measured at respective positions of offset positions p6 to p12 by sequentially bringing the read head R close to the track T2.

The error rates exceed the target rate $1\times10^{-3}$ at the offset positions p4 and p12. The offset position p4 defines the left side of the track T2, and the offset position p12 defines the right side of the track T2. Therefore, if an intermediate point of both positions is obtained, this point indicates a position of the track T2.

As explained above, according to the present measuring method, data is read and an error rate is measured at some positions by bringing the read head close to the track T2 from both sides of the track T2, thereby searching a point at which the error rate reaches or exceeds a target value. Because there are two points at which the error rate reaches the target value, a center of the two points becomes a position of the track T2. When a track width is known in advance, a center position of the track can be obtained based on one position at which the error rate reaches the target value.

Figure 10:
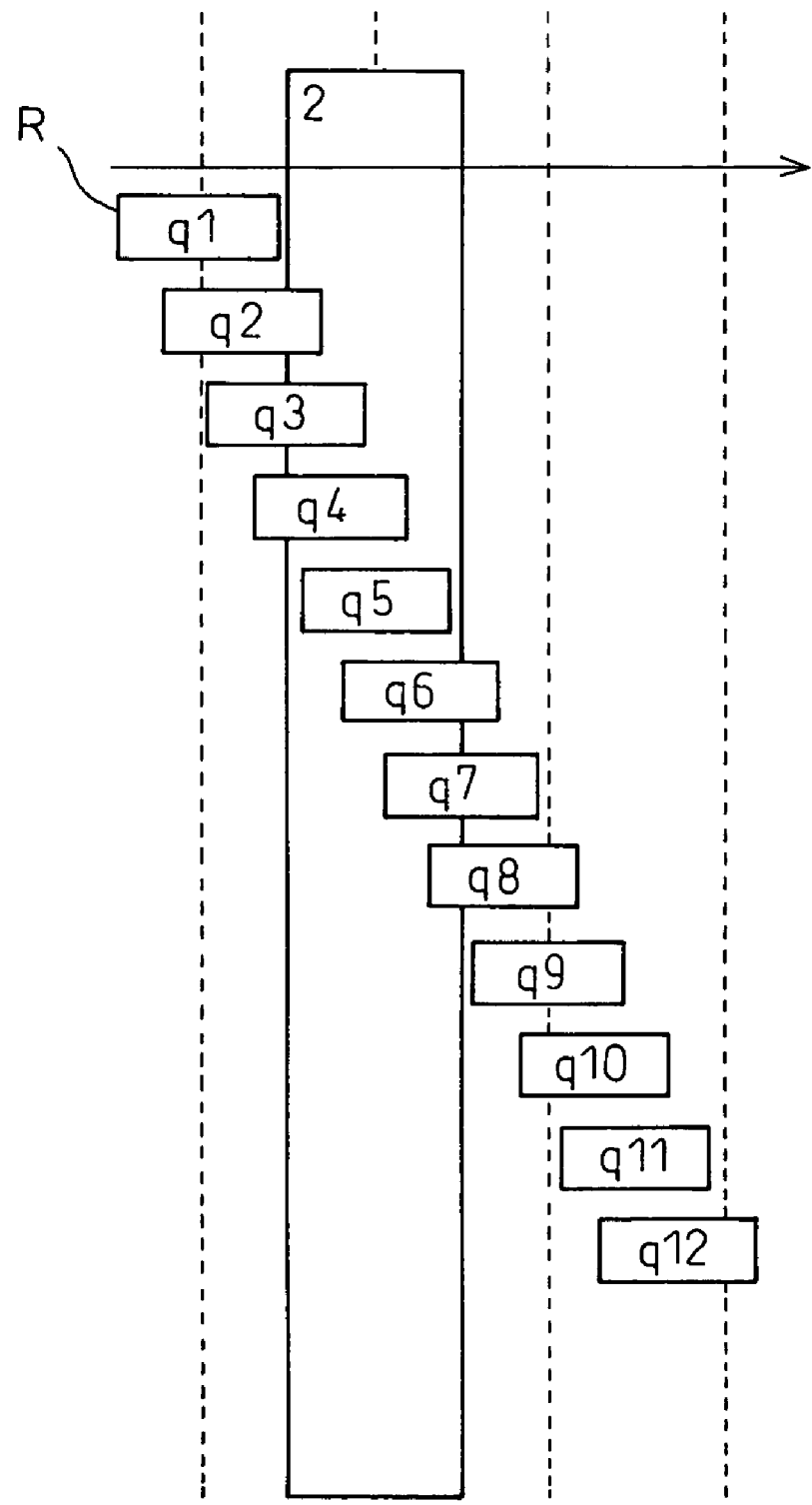
FIG. 10 is an explanatory diagram of a method of measuring a size of track deviation using an AGC gain according to the present invention.

A method of obtaining a position of a target track by using an AGC (Automatic Gain Control) gain of a read signal is explained next with reference to FIG. 10 and FIG. 11. The read channel shown in FIG. 1 includes an AGC circuit 26 that holds a head output signal from the head amplifier 19 at a constant signal level. A gain of the AGC circuit 26 becomes large when the output of the read signal is small, and becomes small when the output of the read signal is large.

In a manner similar to that of using the offset margin, data is written into only the target track T2, and no data is present around this data. Thereafter, the read head R is positioned on an offset position q1 with a distance from the track T2, and the data is read, thereby reading a gain of the AGC circuit 26 from the obtained read signal. The position q1 is positioned with a distance fro the track T2. Therefore, when a read signal is zero, an AGC gain becomes a maximum value. Next, the read head R is positioned on an offset position q2, and reads data. The read head R reads a gain of the AGC circuit 26 from the obtained read signal. In this case, the read head R can read a part of the data from the track T2. Therefore, an AGC gain of the AGC circuit 26 from the read signal becomes smaller than a maximum value. In this way, the read head R sequentially read data at offset positions q2, q3, etc. that are gradually close to the track T2, and reads AGC gains from the obtained read signals. At an offset position q5, the read head R can read all written data, and a signal output becomes a maximum. Therefore, the AGC gain becomes a minimum. At positions q6, q7, etc. after exceeding the offset position q5, AGC gains gradually become larger. An offset position q9 is out of the track T2, and an AGC gain becomes a maximum at this position again.

Figure 11:
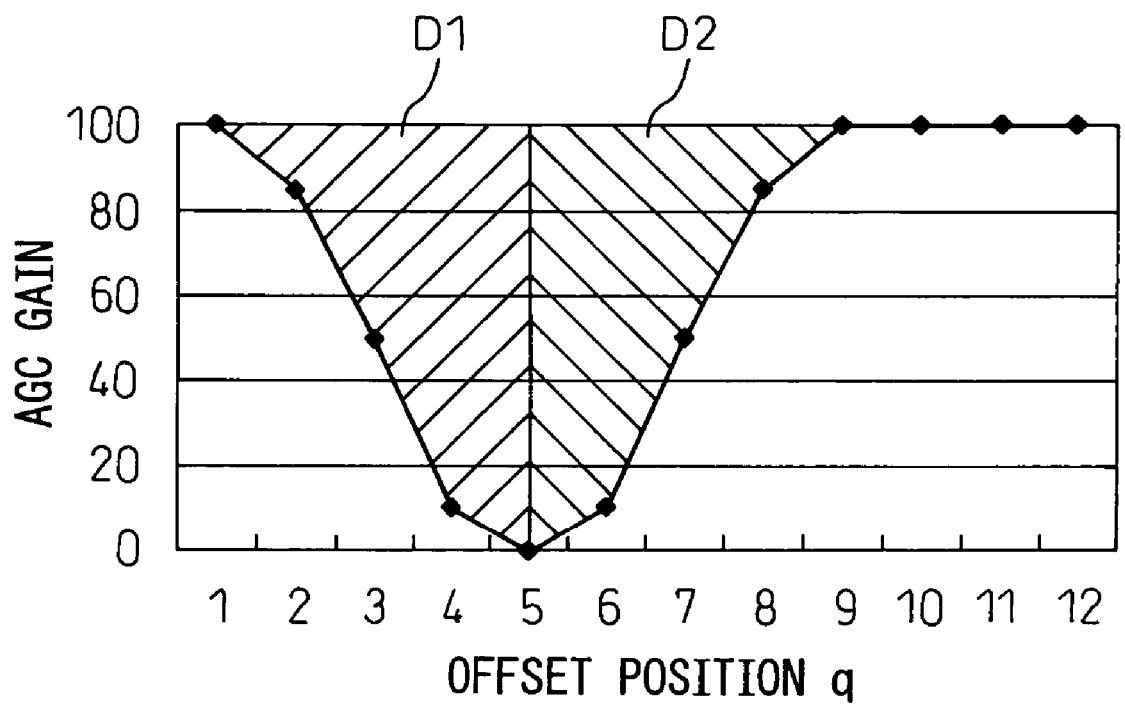
FIG. 11 is a graph showing a relationship between an offset position and an AGC gain measured according to the preset invention.

FIG. 11 shows a graph of AGC gains obtained at the offset positions q1 to q12. The graph shows a normalized distribution of the AGC gains, with a minimum value the AGC gain set as 0 and a maximum value of the AGC gain set as 100. An area D1 formed by a line of the gain graph starting from the maximum value to the minimum value, and an area D2 formed by the line starting from the minimum value to the maximum value are obtained. A center position, that is, the position q5 in this case, at which the areas are equal, is obtained, thereby obtaining a position of the track T2. A method of obtaining the position of the track T2 is not limited to this, and various other methods can be also used.

When a position of a target track is obtained, it is decided whether there is deviation from a track that is determined based on the correct servo pattern (step S10). When there is no deviation, it is decided that an error has occurred due to other factor such as a defect of the medium, and the process proceeds to step S12. When there is deviation, an address of a position of this deviation and a size of the deviation are stored in a memory at step S1, and the process proceeds to step S12. The size of the deviation can be easily obtained from a difference between the deviated position of the track and the position indicated by the servo pattern of the track. At step S12, it is decided whether an error track is the last error track. When the track is not the last error track, the next target track, that is, the next error track, is selected at step S13, and the process returns to step S9. At step S9, a position of the target track is measured. When there is a deviation, a position of the deviation and a size of the deviation are stored in the memory.

After deviation is measured in all error tracks, the process proceeds to step S14, and addresses of all deviated positions and sizes of the deviation are stored in a table that stores a core deviation correction.

As described above, according to the present embodiment, positional deviation of a track caused by an abnormal track pitch can be accurately detected. Further, a position of the track in which positional deviation occurs can be measured, and deviation of the track can be obtained.

In the present embodiment, while data are written on even tracks first and thereafter data are written on odd tracks, it is needless to mention that data can be written on the even tracks after data are written on odd tracks.

In the present embodiment, data are written into all tracks and thereafter these data are read. However, after all tracks are divided into several areas, the test can be carried out sequentially.

What is claimed is:

1. A method for testing a magnetic disc device, comprising at least:

writing data on every other track of the magnetic disc according to a servo pattern;

writing data on the rest of the tracks;

reading data from all tracks in which data are written;

determining whether a read error occurs;

determining a track having a deviation of a track pitch based on the read error;

arranging that data is written on a track in which a read error occurs, and no data is written on tracks surrounding the track in which the read error occurs;

starting reading of data from a position away from one side of the track, and sequentially reading data at some positions, each of which is gradually closer to the track;

obtaining a first position where an error rate of reading the data reaches a predetermined error rate;

starting reading of data from a position away from the other side of the track, and sequentially reading data at some positions, each of which is gradually closer to the track; and obtaining a second position where an error rate of reading the data reaches a predetermined error rate, wherein a position of the track is calculated based on the first position and the second position.

* * * * *